United States Patent
Bleckmann et al.

(10) Patent No.: US 12,299,733 B2
(45) Date of Patent: May 13, 2025

(54) SYSTEMS AND METHODS FOR INCREASING THE MIGRATION AND ACCESSIBILITY OF DATA

(71) Applicant: Avery Dennison Retail Information Services LLC, Mentor, OH (US)

(72) Inventors: Frederick Bleckmann, Barrington, NH (US); Jeremy Schenof, Chicago, IL (US); Richard S. Loritsch, La Crescenta, CA (US); Cindy Kwan, Pasadena, CA (US); Michael J. Kuhno, Youngsville, NC (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 170 days.

(21) Appl. No.: 17/999,714

(22) PCT Filed: Jun. 2, 2021

(86) PCT No.: PCT/US2021/035332
§ 371 (c)(1),
(2) Date: Nov. 23, 2022

(87) PCT Pub. No.: WO2021/247628
PCT Pub. Date: Dec. 9, 2021

(65) Prior Publication Data
US 2023/0222570 A1 Jul. 13, 2023

Related U.S. Application Data
(60) Provisional application No. 63/034,079, filed on Jun. 3, 2020.

(51) Int. Cl.
*G06Q 30/00* (2023.01)
*G06Q 10/087* (2023.01)
(Continued)

(52) U.S. Cl.
CPC ....... *G06Q 30/0639* (2013.01); *G06Q 10/087* (2013.01); *G06Q 30/0185* (2013.01); *G06Q 30/0202* (2013.01)

(58) Field of Classification Search
None
See application file for complete search history.

(56) References Cited

U.S. PATENT DOCUMENTS

| 8,203,452 | B2 | 6/2012 | Vishik et al. |
| 9,536,123 | B2 | 1/2017 | Chau |

(Continued)

FOREIGN PATENT DOCUMENTS

| JP | 2005-301637 | 10/2005 |
| JP | 2017-36123 | 2/2017 |
| WO | 03/060752 | 7/2003 |

OTHER PUBLICATIONS

International Preliminary Report on Patentability dated Dec. 6, 2022 issued in corresponding IA No. PCT/US2021/035332 filed Jun. 2, 2021.

(Continued)

*Primary Examiner* — Mila Airapetian

(57) ABSTRACT

A data collection, data packaging, and data delivery system that includes methods that provide for accurate digital identity data, inventory data, and associated information from multiple sources to be repackaged and delivered to various destinations are disclosed. A source, such as an edge device, is used to monitor an RFID tagged product and is configured to send data about the RFID tagged product to a designated cloud application. The received data is combined with other product specific data and is sent either directly, or via an intermediate software, to a destination cloud application. The destination cloud application is configured to manipulate the data, adjust pricing for the products, and (Continued)

publish the information in a searchable format for consumers in a local area to determine, for example, if the products are locally available.

29 Claims, 13 Drawing Sheets

(51) Int. Cl.
*G06Q 30/018* (2023.01)
*G06Q 30/0202* (2023.01)
*G06Q 30/0601* (2023.01)

(56) References Cited

U.S. PATENT DOCUMENTS

| | | |
|---|---|---|
| 10,607,238 B2 | 3/2020 | Sobalvarro et al. |
| 10,826,986 B2 | 11/2020 | Yamada |
| 2007/0272746 A1 | 11/2007 | Ortiz et al. |
| 2017/0026142 A1 | 1/2017 | Kim et al. |
| 2017/0148077 A1 | 5/2017 | Phillips et al. |

OTHER PUBLICATIONS

International Search Report and Written Opinion dated Sep. 17, 2021 issued in corresponding IA No. PCT/US2021/035332 filed Jun. 2, 2021.

SYSTEMS AND METHODS FOR INCREASING THE MIGRATION AND ACCESSIBILITY OF DATA

CROSS-REFERENCE TO RELATED APPLICATION

The present application is a 371 of International Application No. PCT/US2021/035332, which was published in English on Dec. 9, 2021, and claims the benefit of U.S. Provisional Patent Application No. 63/034,079 filed Jun. 3, 2020, both of which are incorporated herein by reference in their entireties.

FIELD

The present invention relates generally to a data collection, data packaging, and data delivery system. More specifically, the data system includes methods that provide for accurate digital identity data, inventory data, and associated information from multiple sources to be repackaged and delivered to various destinations. Accordingly, the present specification makes specific reference thereto. However, it is to be appreciated that aspects of the present invention are also equally amenable to other like applications, devices and methods of manufacture.

BACKGROUND

Generally stated, RFID is the use of electromagnetic energy to stimulate a responsive device (known as an RFID "tag" or transponder) to identify itself and, in some cases, provide additional information and/or data stored in the tag. RFID tags typically contain a semiconductor device commonly referred to as the "chip", upon which are formed a memory and an operating circuitry, which is connected to an antenna. Typically, RFID tags act as transponders, providing information stored in the chip memory in response to a radio frequency interrogation signal received from a reader, also referred to as an interrogator. The reader converts the radio waves from the RFID device into a form that can be utilized by a computer.

RFID tags and labels are widely used to associate an object with a unique identification code. When used to track or manage inventory, the microprocessor stores unique identifying data associated with the inventory. An operator can use an external receiver/reader to retrieve the stored data and process or track the inventory. The use of RFID tags to track, identify, and locate goods has grown significantly in recent years. This is because RFID tags allow manufacturers, distributers, and retailers, amongst others, to regulate products and inventory, quickly determine production, manufacture, distribution, or retail needs and efficiently intake and remove items utilizing RFID tags from inventory or other supply chain situations. The RFID tags themselves can provide any desired product data and may be scanned or read in any of a variety of manners through the use of any device that has a reader or a scanner.

Similarly, various physical items have a digital identity that may be registered and collected by various known systems for inventory, point of sale, marketing, product information, security, authentication, and chain of custody purposes. Oftentimes the digital identity of a physical item is also useful in situations in which the ultimate use of the item is different than what was originally intended (i.e., future use cases), or unforeseen. Currently, data originates from multiple origins and is assembled by a plurality of different sources in a manner that does not always conform to potential future use cases.

For example, it is currently common practice to collect data locally at an on-premises application, in the cloud, and/or in a closed application. However, these data applications oftentimes make it difficult for other resources to leverage or access the data, for example, in real time. Retailers, service providers, industry representatives, logistics, and consumer engagement oftentimes fall short of their full potential because they either do not have the ability to gather an item's full digital identity or accompanying information, or because they lack the means for proper analysis of the data to maximize the current use-case of the item. Additionally, the shortfall may be caused by the need to have multiple data processing points with each data processing point managing the data internally, thereby creating inefficiencies and delay that could result in the loss of useful access to meaningful data.

Therefore, there exists in the art a long felt need for a system and/or method of enabling users to benefit from the timely gathering and migration of data. For example, retailers, service providers, industry and logistics personnel, consumers, and others could all benefit from the ability to send digital identity data downstream to use-cases such as, but not limited to, driving sales activity, communication of safety information, specifying ownership, and authenticating products. Additionally, the parties would also benefit from a trusted exchange of data, and the sender of such data, in particular, would benefit from the ability to send its data in its own standard configuration.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Methods for receiving various formats of data from a plurality of different data sources, repackaging the received data for a particular destination, and securely and reliably delivering the packaged digital identity data are described herein. The ability to utilize data from multiple sources which would otherwise be cumbersome to accumulate and/or repackage, provides retailers, service providers, industry and logistics personnel, and consumers, and others with financial, experience, safety, and efficiency benefits otherwise not accessible. Further, the accessibility of such data provides enhanced value and opportunity to the data owner.

System for collecting, packaging, and delivering data are also described herein. In some embodiments, the system contains a repository for receiving data about a serialized item from a source. The repository may be a designated application, such as a cloud application, for example, an intermediate software. The serialized item may be a RFID tagged, UPC coded or ERP coded product that contains a digital identity about the product that is readable by the source. The digital identity may contain a product unique identity, an item expiration, or other product related data, and the source of the data may contain an edge device, such as smart shelves, smart coolers, smart stores, or smart storage having a RFID reader/interrogator that has an electronic display and that monitors the products in proximity thereto. For example, when the serialized item is removed from, to, or around the source, the source may communicate that information to the repository.

In some embodiments, the repository may be a designated cloud application, and is preferably configured to receive the data about the serialized item from the source and manage the product's digital identity. The repository may similarly manage a volume of inventory of the product based on the received information from the source, and is further configured to combine or aggregate the received data about the product with other product specific data, environmental specific data, consumer behavior data, or other variable and/or fixed data feeds.

In some embodiments, the system further contains a single or plurality of digital destinations including, but not limited to, cloud application(s). The destination application is configured to receive and publish the combined data sent from the repository via a connector. The connector may be an active directory gateway, cloud connector or the like. The destination application can provide product data, availability, inventory, etc. to searchers in a local area. Additionally, pricing information related to the product may be manipulated by the destination application based on, for example, the product expiration date, shelf life or other data that suits user need and/or preference.

The destination application may then publish the data in a searchable format. Additionally, the destination application can transmit the data back to the source or other electronic display at a retail location, so that the same may benefit from the aggregated and/or updated data. For example, a consumer could view an identical price for the product online at the destination application that they would see at the retail location.

In some embodiments, the methods and systems are as described above and the systems contains a destination cloud application for receiving, manipulating, and publishing data about a serialized item from a source. The serialized item may include, without limitation, a RFID tagged, UPC coded or ERP coded product that contains a digital identity about the product that is readable by the source. The digital identity may comprise a product unique identity, an item expiration, or other useful product data. The source may be an edge device which can contain a fixed or handheld device for communication with sensors or machine readable code, such as smart shelves, smart coolers, smart store, or smart storage and having a RFID reader/interrogator that has an electronic display and monitors the products/serialized items located at the source. For example, when a serialized item is removed, added, or manipulated by a customer or staff from, to, or around the source, the source may communicate that information to the destination cloud application.

Similar to the previous embodiment referenced above, the destination cloud application receives the data about the serialized item from the source, and manages the product's digital identity via a connector. The destination cloud application similarly manages a volume of inventory of the product based on the received information from the source. The destination cloud application is configured to combine the received data about the product with other product specific data. The connector may be an active directory gateway, cloud connector or similar device. The destination cloud application can then provide the combined product data or any portion thereof to searchers in a local area. Additionally, pricing information related to the product may be manipulated by the destination cloud application based on, for example, the product expiration date, shelf life or other useful data.

The destination cloud application may then publish the data in a searchable format available to consumers in a local area. Additionally, the destination application or repository can transmit the data back to the source or other electronic display at a retail location, which may also use the combined data. For example, a consumer may view an identical price for the product online at the destination cloud application that they would see at the retail location.

In other embodiments, methods and systems for increasing migration and accessibility of product related data are described herein. The system contains a designated application, such as a cloud application, for receiving data about a serialized item from a source, and the designated application may be an intermediate software. As above, the serialized item may be an RFID tagged, UPC coded or ERP coded product that contains a digital identity about the product that is readable by the source, and the digital identity may contain a product unique identity, an item expiration, or other useful product data or information. The source may be an edge device, such as smart shelves, smart coolers, smart stores, or smart storage with a RFID reader/interrogator that has an electronic display and the ability to monitor the serialized items. For example, when a serialized item is removed from the source, the source may communicate that information to the repository which may, in turn, update the product data stored therein.

The designated application is configured to receive the data about the serialized item from the source, and manage the product's digital identity. The designated application similarly manages a volume of inventory of the product based upon the received information from the source. The designated application is further configured to merge the received data about the product with other product specific data, and may also receive data related to the serialized item from a plurality of data collection points. The plurality of data collection points are sources that do not otherwise lend themselves to a data share atmosphere, such as inventory scans, point of sale data, distributor data, data center data or the like.

The system can further contain a destination application. The destination application is configured to receive, manipulate, and publish the combined data sent from the designated cloud application. The destination application can provide product data, availability, and inventory data to searchers in a local area. Additionally, pricing information related to the product may be manipulated by the destination application based upon the product expiration, shelf life or other data related to the product.

The destination application, e.g., cloud application, then publishes the combined data in a searchable format for consumers in a local area. Additionally, the destination application can transmit the data back to the source or other electronic display at a retail location. A consumer could then view an identical price for the product online at the destination application that they would see at the retail location, and determine if there is local inventory in stock for purchase.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
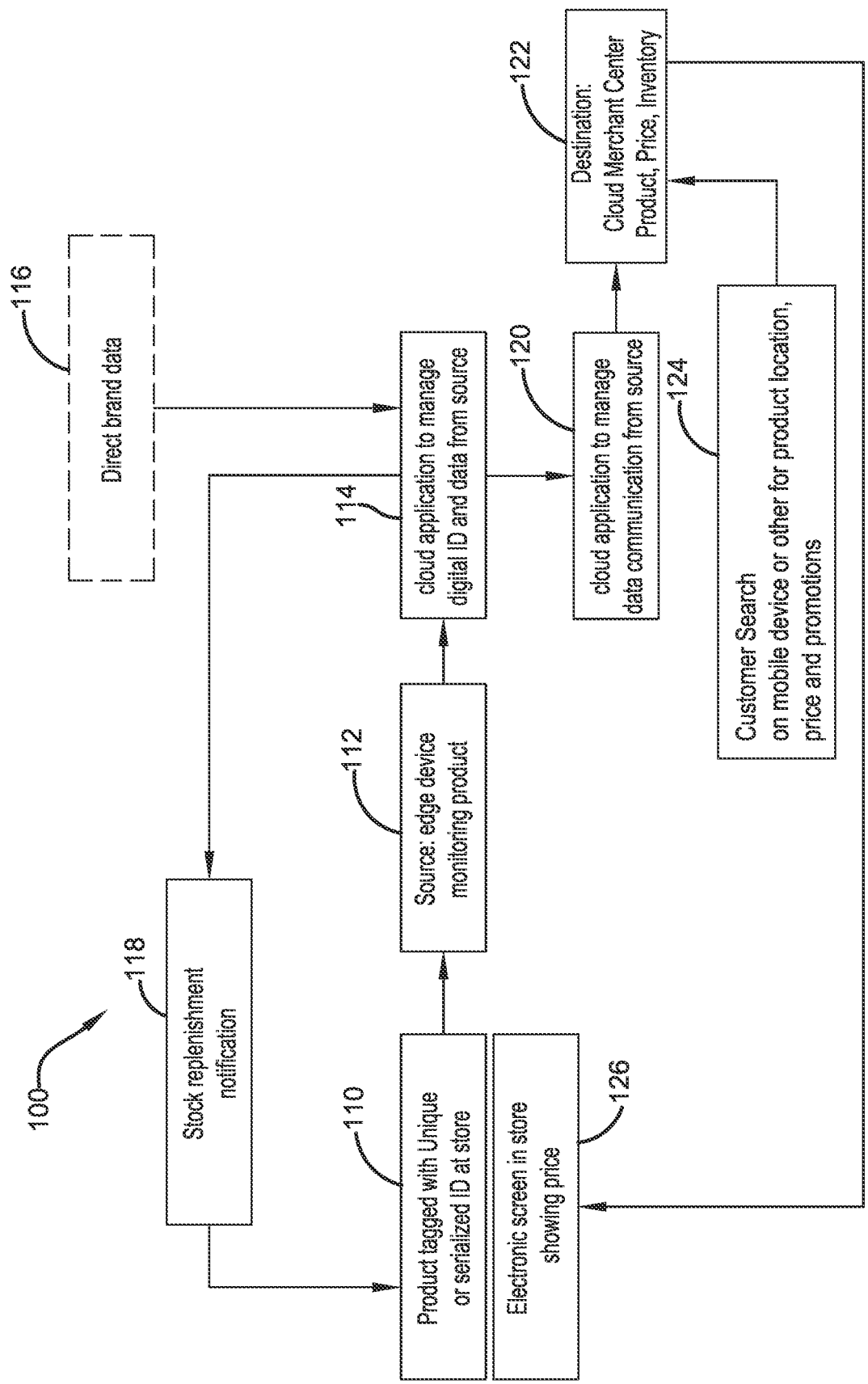
FIG. 1 is a block diagram of a system for collecting, packaging, and delivering data in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Data collection, packaging, and delivery systems that include methods that provide for accurate digital identity data, inventory data, and associated information from multiple sources to be repackaged and delivered to various destinations are described herein. In some embodiments, the system contains a receiving function, an association function, a decision function, a packaging function, a history function, and a delivery function. Data may be collected from a source by reading RFID data, universal product code (UPC) data, enterprise resource planning (ERP) data, or other known equivalents and/or data carrying technology. The source data is then delivered to a repository that manages the digital identities, and associates additional data with the source data. The data is then prepared for delivery to its destination by way of a connector that manages the delivery of the data to the destination.

The systems and methods of the current invention enable users and senders to benefit from the efficient gathering, aggregation and migration of data. Additionally, a plurality of data collection points that do not otherwise lend themselves to a data share atmosphere may also form part of the system and data therefrom may be made available for sharing and/or distribution. Retailers, service providers, industry and logistics personnel, consumers, and others benefit from the ability to send digital identity data downstream to use-cases, such as, but not limited to, driving sales activity, communication of safety information, specifying ownership, and authenticating products. Additionally, the sender of such data will benefit from a trusted exchange of data, as well as the ability to send data in the sender's own standard configuration.

In some embodiments, the data of a RFID tag or other serialized item being monitored by an edge device is sent directly from the edge device to a designated application, such as a designated cloud application. The designated application manages the digital identity of the serialized item, and thereby represents specific information about the item including, but not limited to, the item's unique identity, volumes, expiration date, etc. The data received from the edge device may then be combined with other product specific data, such as product ID's, descriptions, inventory counts, price incentive thresholds, etc.

The combined or aggregated data can then be sent either directly to, or via an intermediate software that will manage the rules and interaction with, a destination application, such as a destination cloud application, that may publish the data for public consumption and/or search. For example, the destination application can provide users with product data, availability, inventory, pricing, etc. Additionally, there is a desire to show pricing information that can be manipulated based upon, for example, product expiration data tagged on site with the RFID tag or other serialized method. The use of electronic displays at the retail location, either small type shelf displays or larger video displays, can also be incorporated into the system to display pricing to a customer. By following the procedures and methods expressed herein, the customer may view an identical price online as they would see in a retail store.

Referring initially to the drawings, FIG. 1 illustrates a system 100 for collecting, packaging, and delivering data. The system 100 contains a repository 114 and a destination cloud application 122, which may include, for example, an analytics application. The repository 114 is configured to receive data about a serialized item 110 from a source 112. The serialized item 110 is typically a consumer product that is serialized with a data carrying technology, such as, but not limited to, an RFID tag, a UPC tag, an ERP tag, or the like. The serialized item 110 contains a digital identity, such as an item unique identity, an item expiration, or other product data.

The source 112 is typically an edge device, such as smart shelves, smart coolers, smart stores, smart storage, or the like, that would be typically found in a retail setting. The serialized item 110, such as a RFID tagged product having a unique identity, is placed on, and is monitored by, the edge device. The edge device may also have an electronic or video display that can display a current price of the product, or other useful information, for a consumer. If the product is removed from the edge device, a source reader, such as an RFID reader incorporated in the edge device, can indicate that the product has been removed from the edge device.

The repository 114 is configured to manage the digital identity and data sent from the source 112 of the serialized item 110. The repository 114 may be a cloud application, and is further configured to receive other product or item specific data 116, such as direct brand data, product ID's, descriptions, an image of the product, inventory counts, price incentive thresholds, etc. The repository may then combine or aggregate the product specific data 116 with the data sent from the source 112, and utilize the combined data for a multitude of different purposes.

For example, the repository 114 may then send a stock replenishment notification 118 back to the source 112 to indicate the need to restock the particular product, or to notify the stock keeper that a product is about to expire and should be removed from the point of sale. The repository 114 may also send the combined data to the destination cloud application 122, which may be accomplished via a connector 120. The connector 120 may be a cloud application or intermediate software configured to manage the data communication with the destination cloud application 122.

Additionally, the destination cloud application 122 may contain a cloud merchant center configured to display searchable inventory data about the serialized item 110 in a local area. For example, the destination cloud application 122 could permit a consumer search 124, on a mobile or other electronic device, for inventory data, product locations, promotions, price, etc., so that consumers in a local area can see what products are available and where they are physically located. The destination cloud application 122 may also be configured to send inventory data about the serialized item 110 to the source 112 and to adjust pricing for the serialized item 110, as desired.

The system 100 also provides the ability to run promotions with respect to one or more of serialized items 110. For example, if a serialized item 110 is near its expiration date, the source 112 shares that information with the destination cloud application 122, which can then adjust the smart label on the smart shelf to lower the price of the serialized item 110. Additionally, holiday pricing, or other special pricing may be accomplished via the system 100 in an effective and efficient manner. For example, destination cloud applications, such as Google®, have local inventory advertising (LIA) services that allow stores or companies to send data that improves store and product visibility by allowing customers to see what products are currently in stock, and at what price. However, heretofore, such services have been hindered by the lack of ability to get accurate and current data to the destination cloud applications. The present system 100 solves this problem, and at scale.

Figure 2:
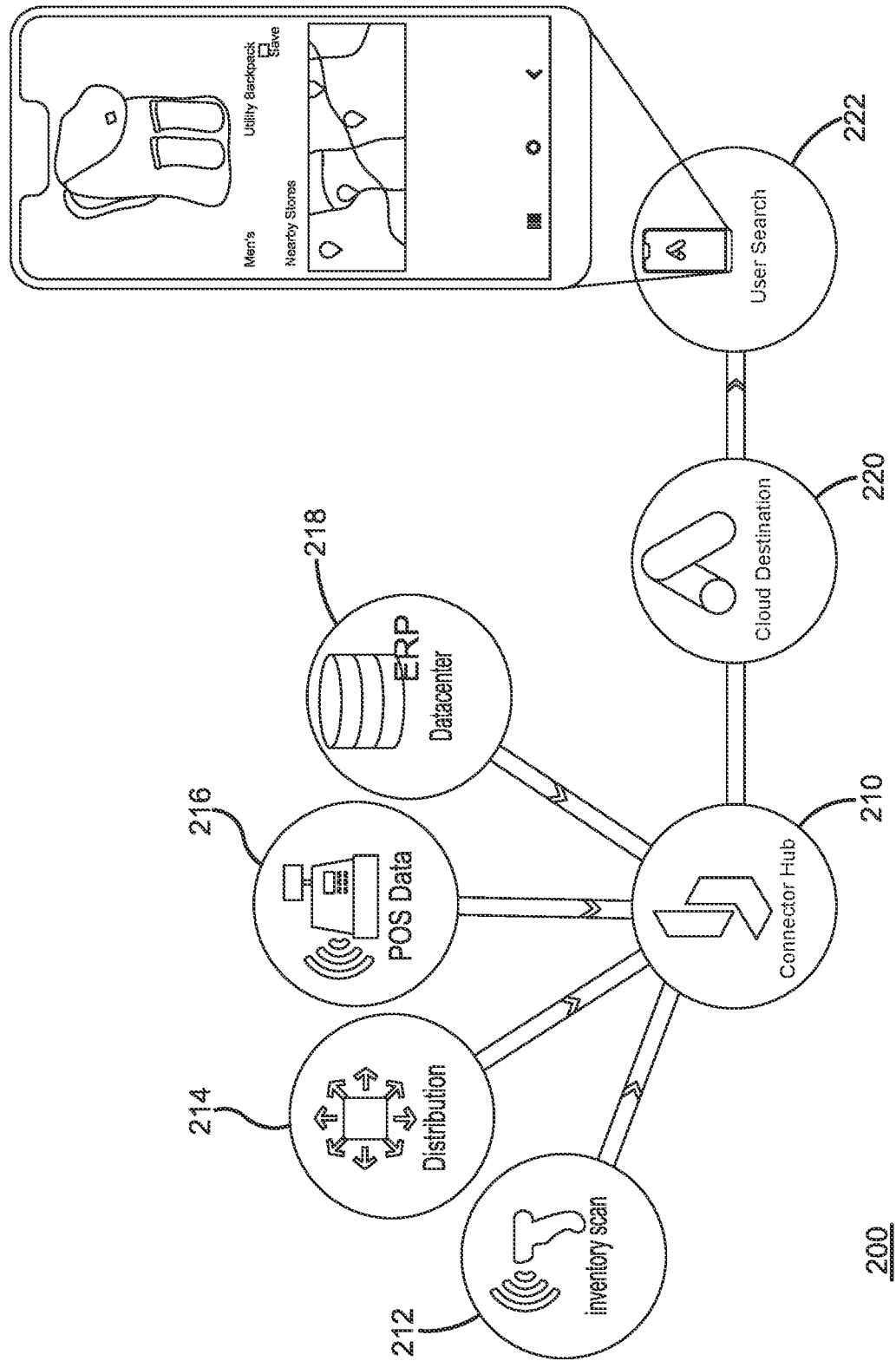
FIG. 2 is an exemplary flow diagram of a system for collecting, packaging, and delivering data from a plurality of data collection points in accordance with the disclosed architecture.

FIG. 2 illustrates a system 200 for collecting, packaging, and delivering data from a plurality of collection points. The plurality of collection points may include, but is not limited to, data from an inventory scan 212 for a serialized item 110 as described in the previous embodiment. The plurality of collection points may further comprise data from a distribution source 214, a point of sale 216, a data center 218, etc. The system 200 contains a connector hub 210 for collecting the data from the plurality of collection points. For example, the connector hub 210 collects the data and sends it to a local inventory feed 220 that can create a local inventory add 222.

Figure 3:
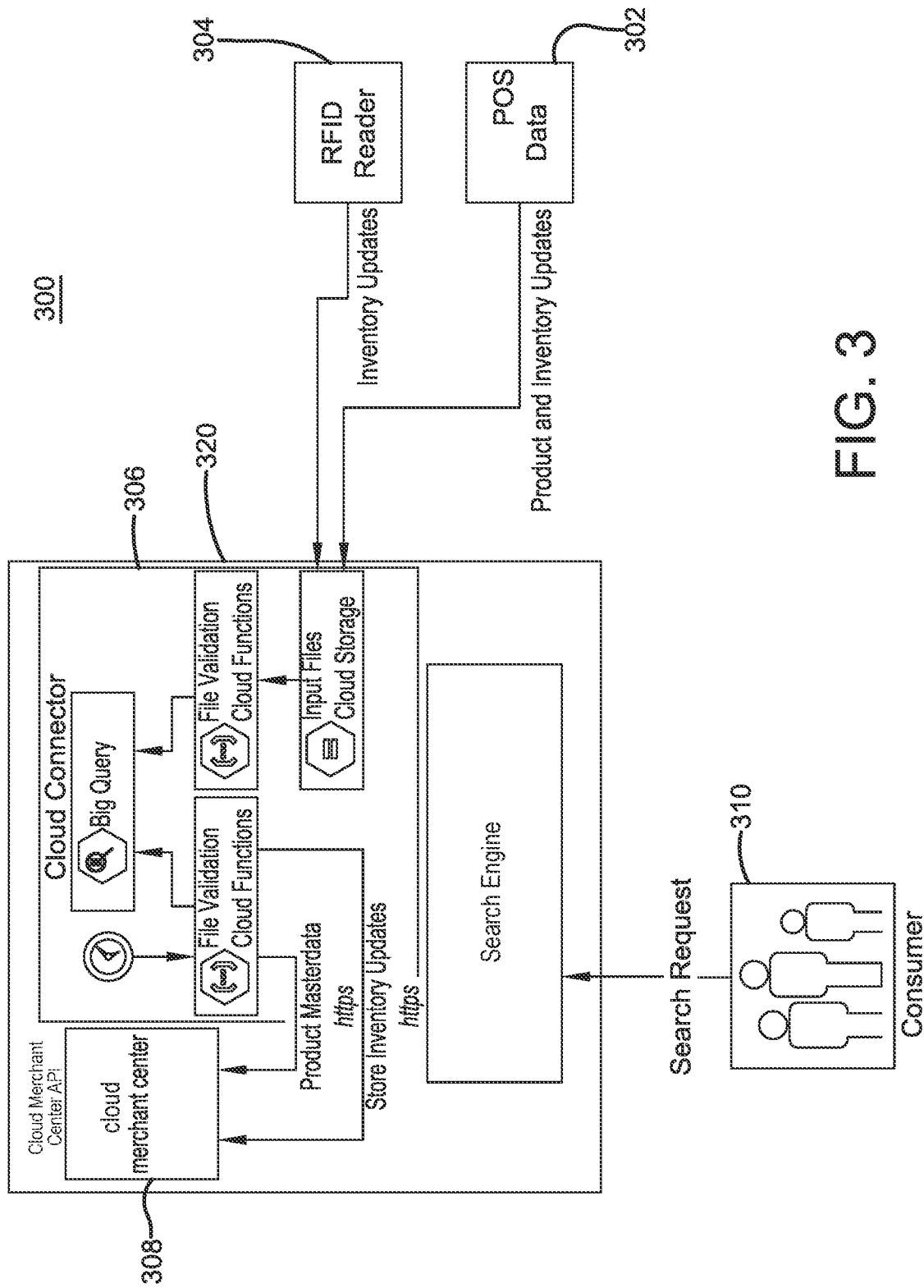
FIG. 3 is an exemplary flow diagram of a system for collecting, packaging, and delivering data in accordance with the disclosed architecture.

In an additional embodiment, FIG. 3 illustrates a system 300 for collecting, packaging, and delivering data. The system 300 contains a destination cloud application 320. The destination cloud application 320 (similar to 122) is configured to receive, manipulate, and publish data about a serialized item from a source, which may be accomplished via a connector 306. As before, the serialized item is typically a consumer product that is serialized with a data carrying technology, such as, but not limited to, an RFID tag, a UPC tag, an ERP tag, or the like. The serialized item will comprise a digital identity, such as an item unique identity, an item expiration, or the like. Table 1 contains exemplary data that could be sent from the source, but is not meant to be a limitation.

TABLE 1

| Example of data delivery from an edge device | | | | |
|---|---|---|---|---|
| AAAABBBBCCCCDDDDEEEE0002 , | device1, 7, | Entry, | 2019-12-03T19:16:40.350399Z |
| AAAABBBBCCCCDDDDEEEE0000, | device1, 7, | Entry, | 2019-12-03T19:16:40.354183Z |
| AAAABBBBCCCCDDDDEEEE0002 , | device1, 7, | InField, | 2019-12-03T19:16:41.552010Z |
| AAAABBBBCCCCDDDDEEEE0000, | device1, 7, | InField, | 2019-12-03T19:16:41.548203Z |

Returning to FIG. 3, an RFID reader 304 is positioned to send updated inventory information from point of sale data 302 to the connector 306. The destination cloud application 320 is configured to receive and combine the point of sale data 302 about the serialized item with additional item specific data as described supra. The combined data for the serialized item in a local area is then displayable in a searchable format 308 for a consumer search 310. The destination cloud application 320 can also send the inventory or other combined data to the RFID reader 304, or to the source incorporating the RFID reader, such as an edge device or smart shelf.

Figure 4:
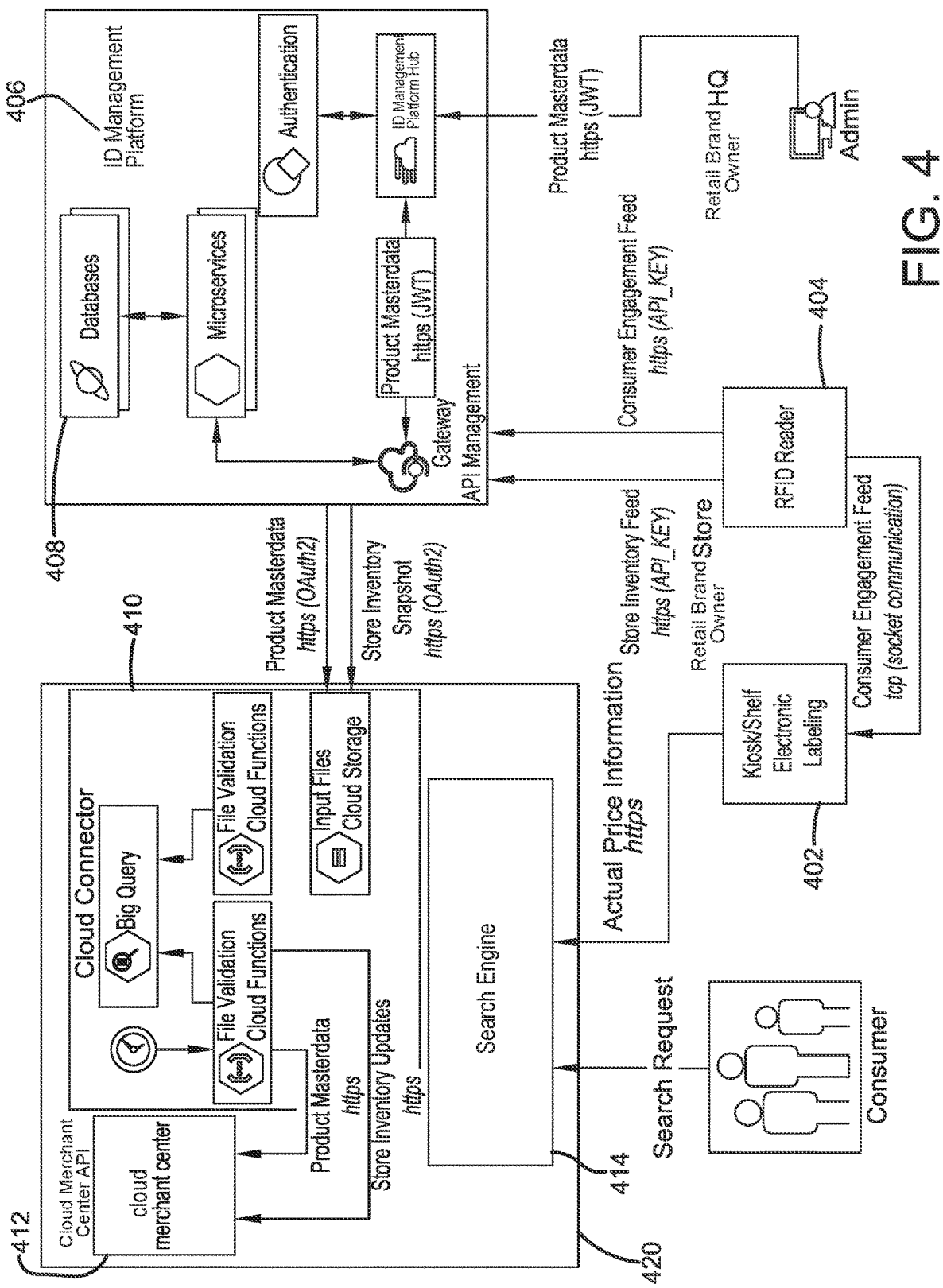
FIG. 4 is an exemplary flow diagram of a system for increasing migration and accessibility of data in accordance with the disclosed architecture.
Figure 5:
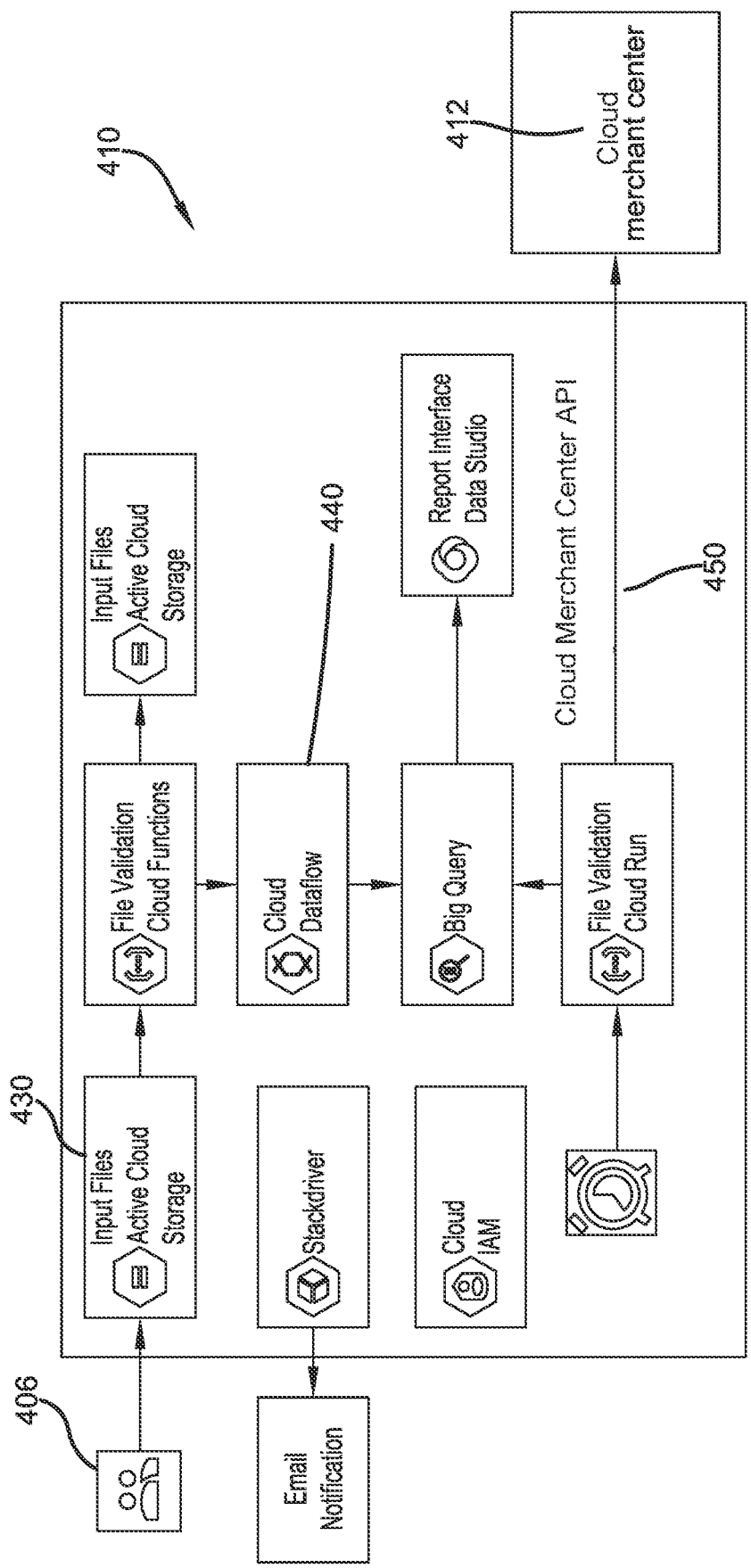
FIG. 5 is a schematic block diagram of a designated cloud application of the system of the present invention for collecting, packaging, and delivering data in accordance with the disclosed architecture.
Figure 6:
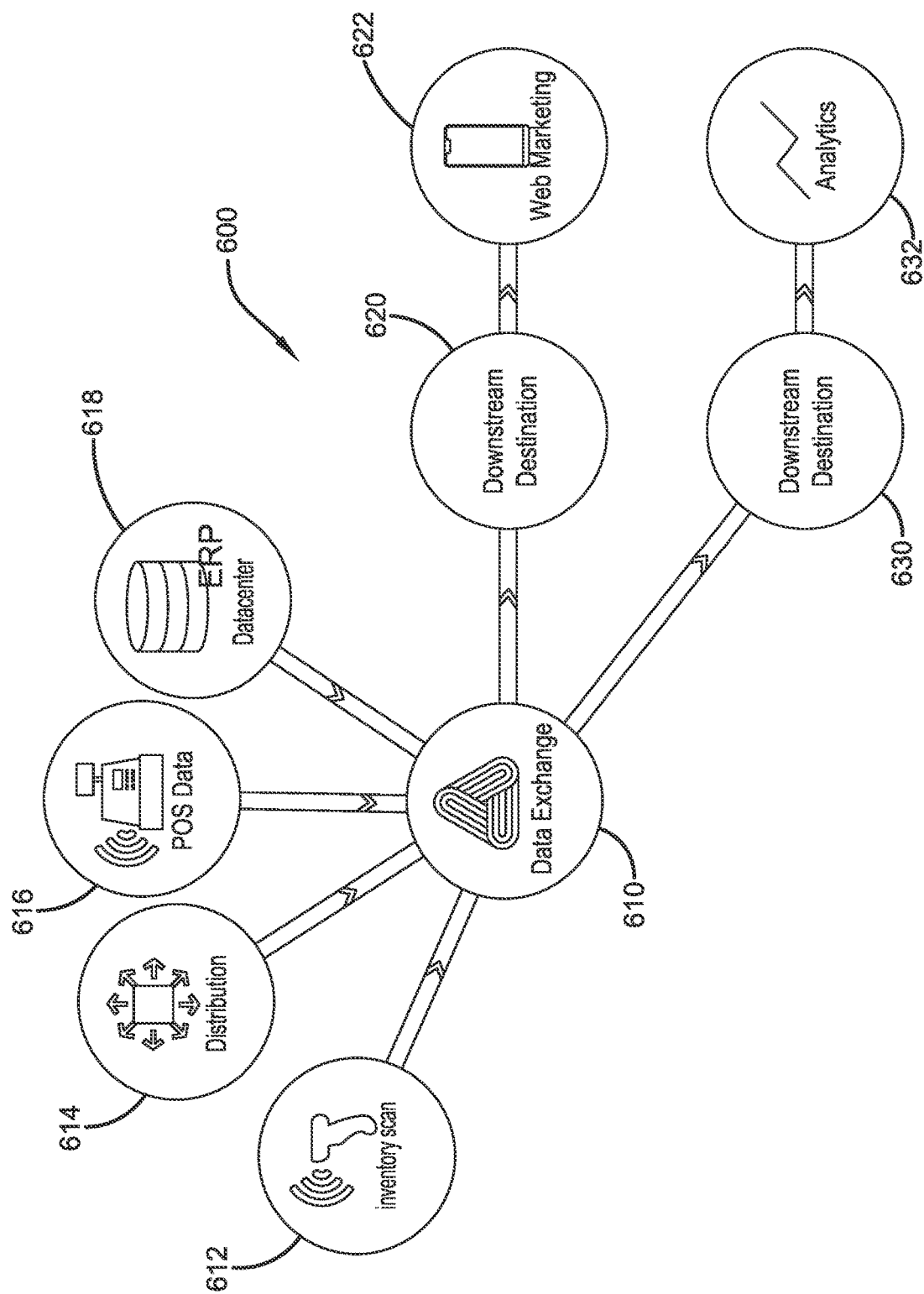
FIG. 6 is an exemplary flow diagram of the system for collecting, packaging, and delivering data in accordance with the disclosed architecture.
Figure 7:
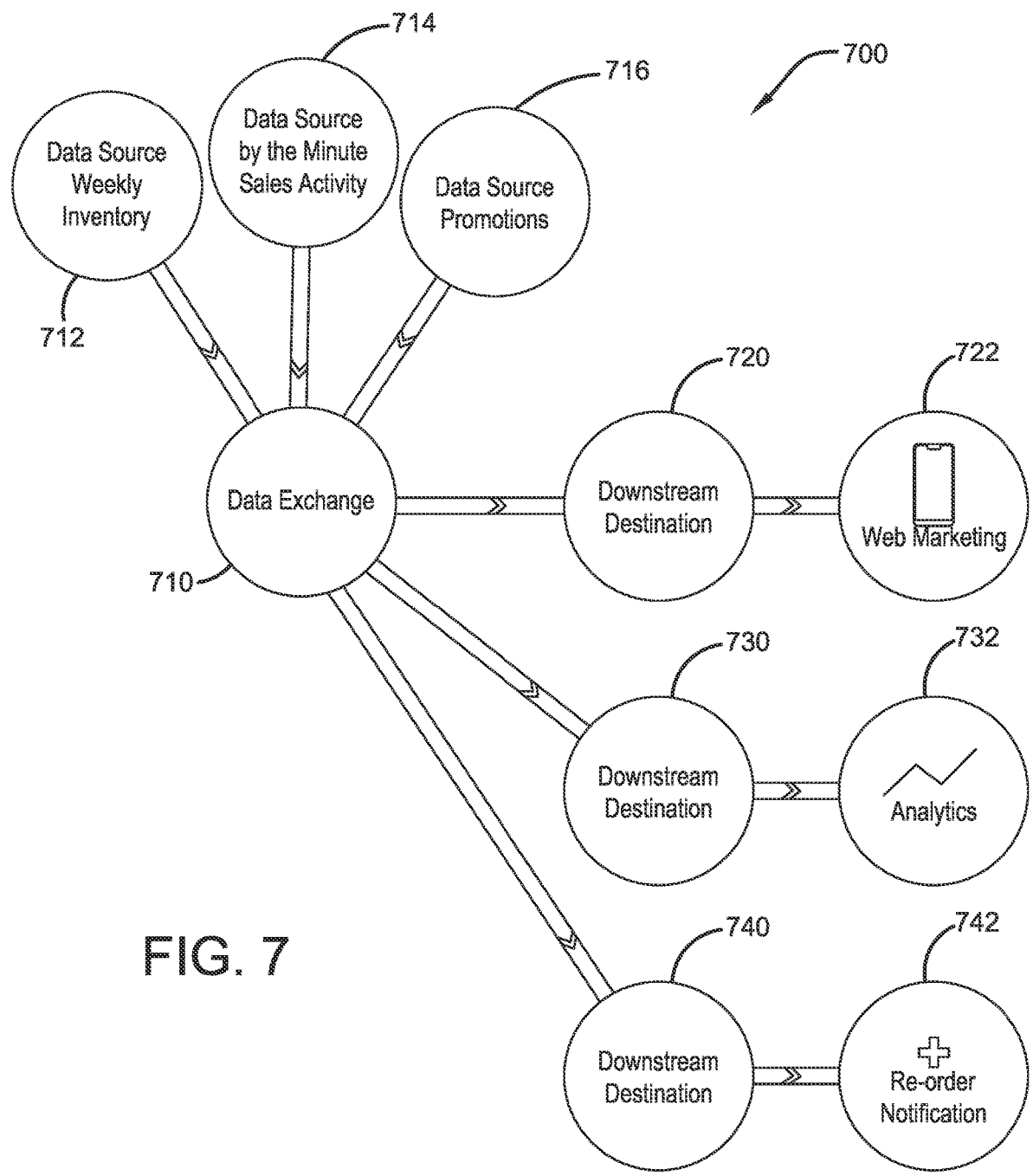
FIG. 7 is an exemplary flow diagram of the system for collecting, packaging, and delivering data used for a retail setting example in accordance with the disclosed architecture.
Figure 8:
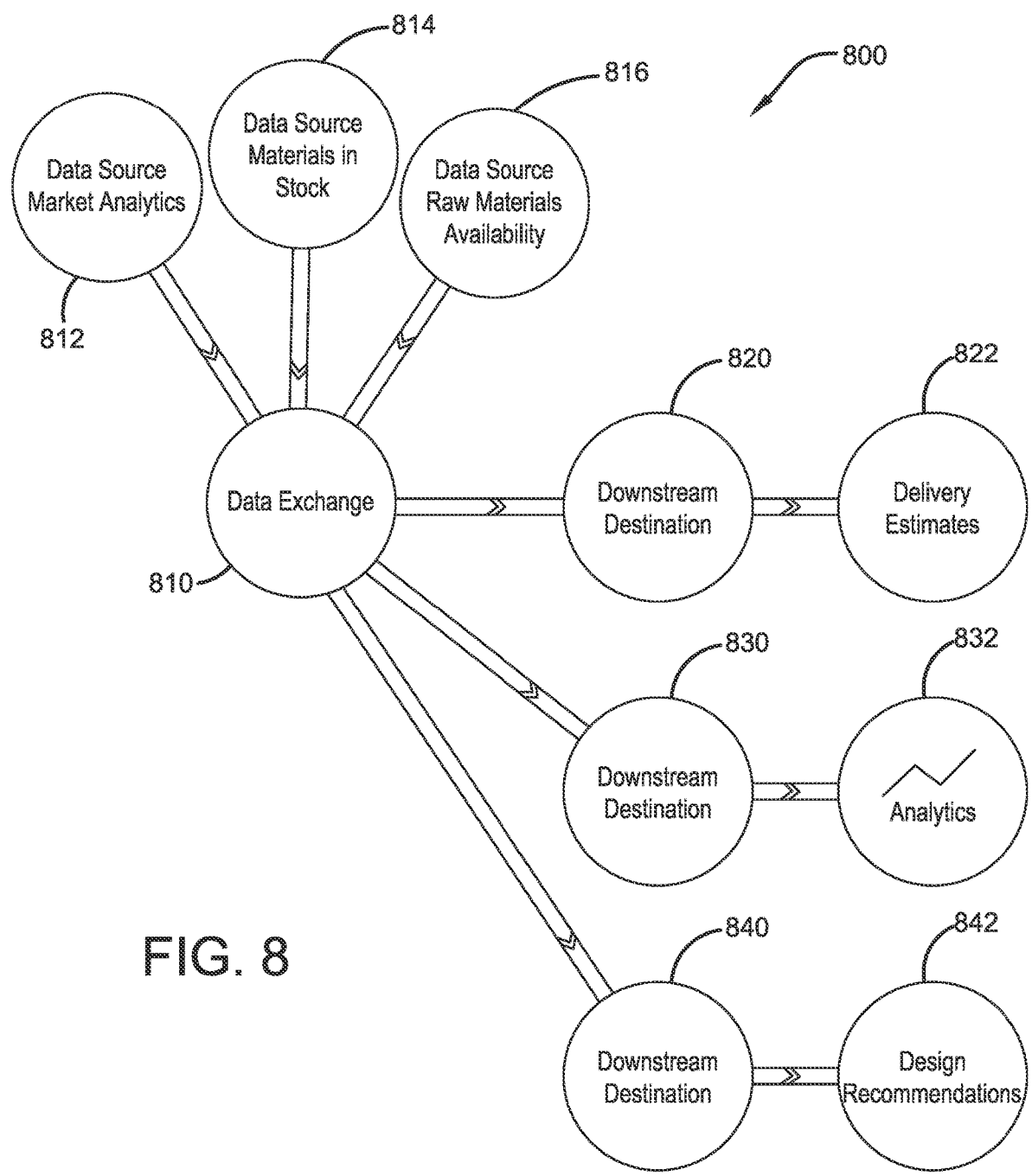
FIG. 8 is an exemplary flow diagram of the system for collecting, packaging, and delivering data used for an industry promotion example in accordance with the disclosed architecture.
Figure 9:
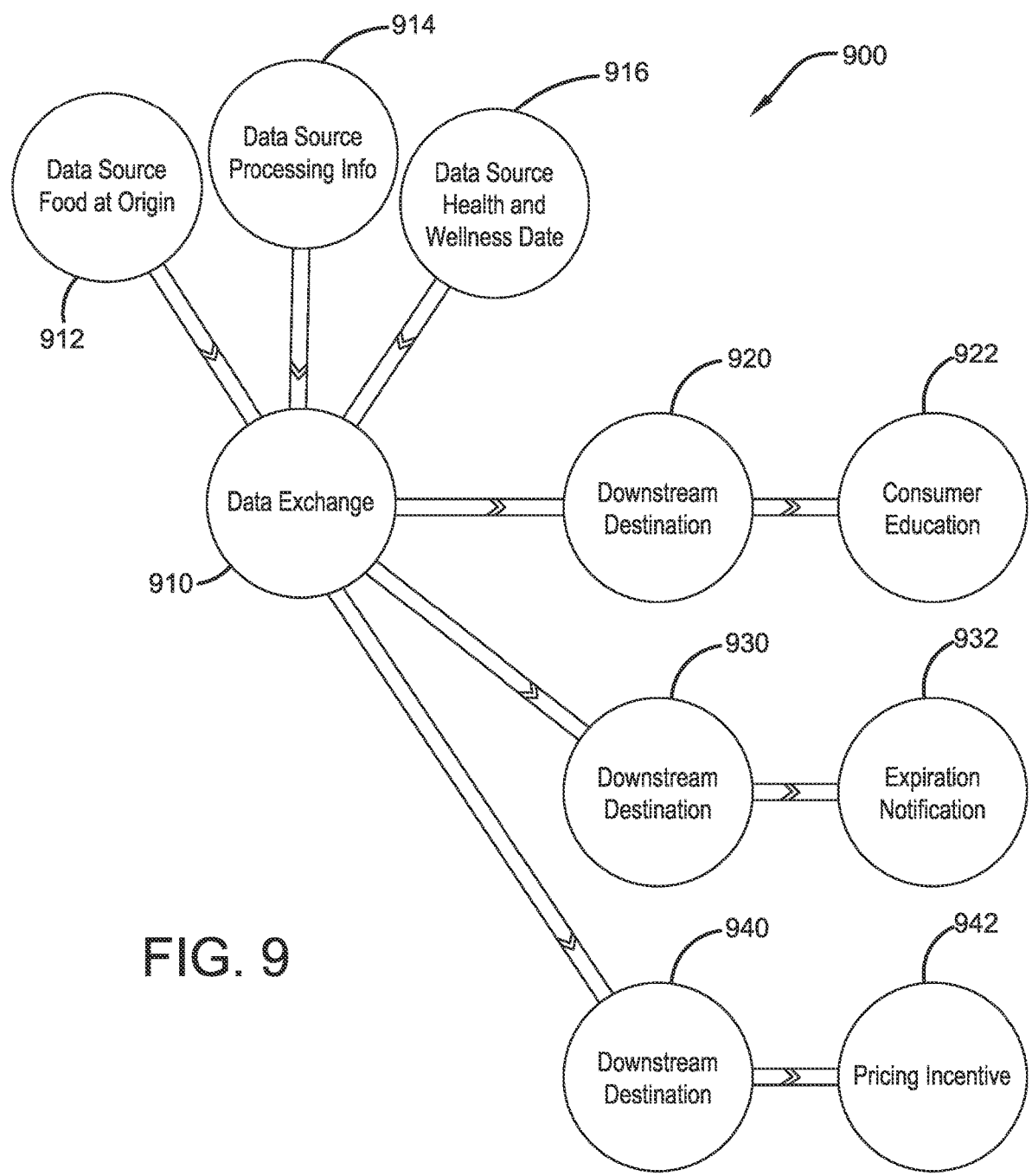
FIG. 9 is an exemplary flow diagram of the system for collecting, packaging, and delivering data used in a food industry example in accordance with the disclosed architecture.

In an additional embodiment, FIGS. 4 and 5 illustrate a system 400 for increasing migration and accessibility of data. The system contains a designated cloud application 406 and a destination cloud application 420. The designated cloud application 406 is configured to receive data about a serialized item 402 (110 described in the previous embodiment) from a source 404. The serialized item 402 (110 described in the previous embodiment) is typically a consumer product that is serialized with a data carrying technology, such as, but not limited to, an RFID tag, a UPC tag, an ERP tag, or the like. The serialized item 402 (110 described in the previous embodiment) will contain a digital identity, such as an item unique identity, an item expiration, or other useful product data.

The source 404 is typically an edge device, such as a smart shelf, a smart cooler, or the like, that would typically be found in a retail setting. The serialized item 40 (110 described in the previous embodiment)2, such as an RFID tagged product having a unique identity, is placed on and monitored by the edge device. The edge device may also have an electronic or video display that can display a current price or other useful product data to a consumer. If the serialized item 402 (110 described in the previous embodiment) is removed from the edge device, a source reader, such as an RFID reader incorporated into the edge device, can indicate that the serialized item 402 (110 described in the previous embodiment) has been removed from the edge device, and update the inventory data accordingly.

The designated cloud application 406 may be a repository and is configured to manage the digital identity and data sent from the source 404 of the serialized item 402 (110 described in the previous embodiment), or from a plurality of collection points (similar to the plurality of collection points described supra for system 200). The designated cloud application 406 is further configured to receive other product or item specific data, such as direct brand data, product ID's, descriptions, an image of the product, inventory counts, price incentive thresholds, etc. from a database 408. The product specific data is then merged with the data sent from the source 404 by the designated cloud application 406.

Once the data has been successfully merged, the designated cloud application 406 then sends the merged product specific data 116 and the data sent from the source 404 to the destination cloud application 420 via, for example, a cloud connector 410. The cloud connector 410 may be a cloud application or active directory cloud connector configured to manage the data communication between the designated cloud application 406 and the destination cloud application 420. The destination cloud application 420 is configured to manipulate and publish the merged data received from the designated cloud application 406.

The destination cloud application 420 may comprise a cloud merchant center 412 configured to display searchable inventory data about the serialized item 402 (110 described in the previous embodiment) in a local area. The destination cloud application 420 may permit a consumer search 414, on a mobile or other electronic device, for inventory data, product locations, promotions, price, etc., so that consumers in a local area can see what products are available and where they are physically present. The destination cloud application 420 is further configured to send inventory data and an inventory update about the serialized item 402 (110 described in the previous embodiment) to the source 404, and to adjust or manipulate pricing as desired based on the merged data.

As illustrated in FIG. 5, the cloud connector 410 receives the data from the designated cloud application 406 into an active cloud storage 430. The data is then run through a cloud data flow 440, and eventually exits to the searchable merchant center 412. The cloud connector 410 can run a local inventory advertising application to adjust or manipulate pricing as desired based on the merged data so that consumers can see what products are available, at which location, and at what price.

FIGS. 6-9 illustrate examples of the previously described systems 100, 200, and 300 for a variety of industries. The systems may contain a receiving function, an association function, a decision function, a packaging function, a history function, a delivery function, or combinations thereof. A data collection, packaging, and delivery system 600 contains a data exchange 610 configured to receive data from a plurality of collection points. The plurality of collection points contain data from an inventory scan 612 for a serialized item 110 as described in the previous embodiments.

The plurality of collection points may further contain data from a distribution source 614, a point of sale 616, and a data center 618. The data exchange 610 collects the data and sends it to a first downstream destination 620. The first downstream destination 620 then sends the data to a web marketing destination 622 for access. The data exchange 610 also sends the data to a second downstream destination 630 which may, in turn, send the data to a platform 632 for analytical analysis.

A data collection, packaging, and delivery system 700 in a retail example contains a data exchange 710 configured to receive data from a plurality of collection points. The plurality of collection points may contain data from a weekly inventory data source 712, a sales activity by the minute data source 714, and a promotions data source 716. The data exchange 710 collects the data and sends it to a first downstream destination 720. The first downstream destination 720 may, in turn, send the data to a web marketing destination 722 for access. The data exchange 710 may also send the data to a second downstream destination 730 which may, in turn, send the data to a platform 732 for analytical analysis. The data exchange 710 may also send the data to a third downstream destination 740 which may, in turn, send the data to a platform 732 for a reorder notification.

A data collection, packaging, and delivery system 800 in an industry production example contains a data exchange 810 configured to receive data from a plurality of collection points. The plurality of collection points may contain data from a marketing analytics data source 812, a material in stock data source 814, and a raw material availability data source 816. The data exchange 810 collects the data and sends it to a first downstream destination 820. The first downstream destination 820 may send the data to a delivery estimate destination 822. The data exchange 810 may also send the data to a second downstream destination 830 which may, in turn, send the data to a platform 832 for analytical analysis. The data exchange 810 may also send the data to a third downstream destination 840 which may, in turn, send the data to a platform 832 for, by way of example, design recommendations.

A data collection, packaging, and delivery system 900 in a food industry example contains a data exchange 910 configured to receive data from a plurality of collection points. The plurality of collection points may contain data from a food at origin data source 912, a processing information data source 914, and a health and wellness data source 916. The data exchange 910 collects the data and sends it to a first downstream destination 920 which may, in turn, send the data to a consumer education destination 922. The data exchange 910 may also send the data to a second downstream destination 930 which may, in turn, send the data to an expiration notification platform 932. The data exchange 910 may also send the data to a third downstream destination 940 which may, for example, send the data to a pricing incentive platform 932.

Figure 10:
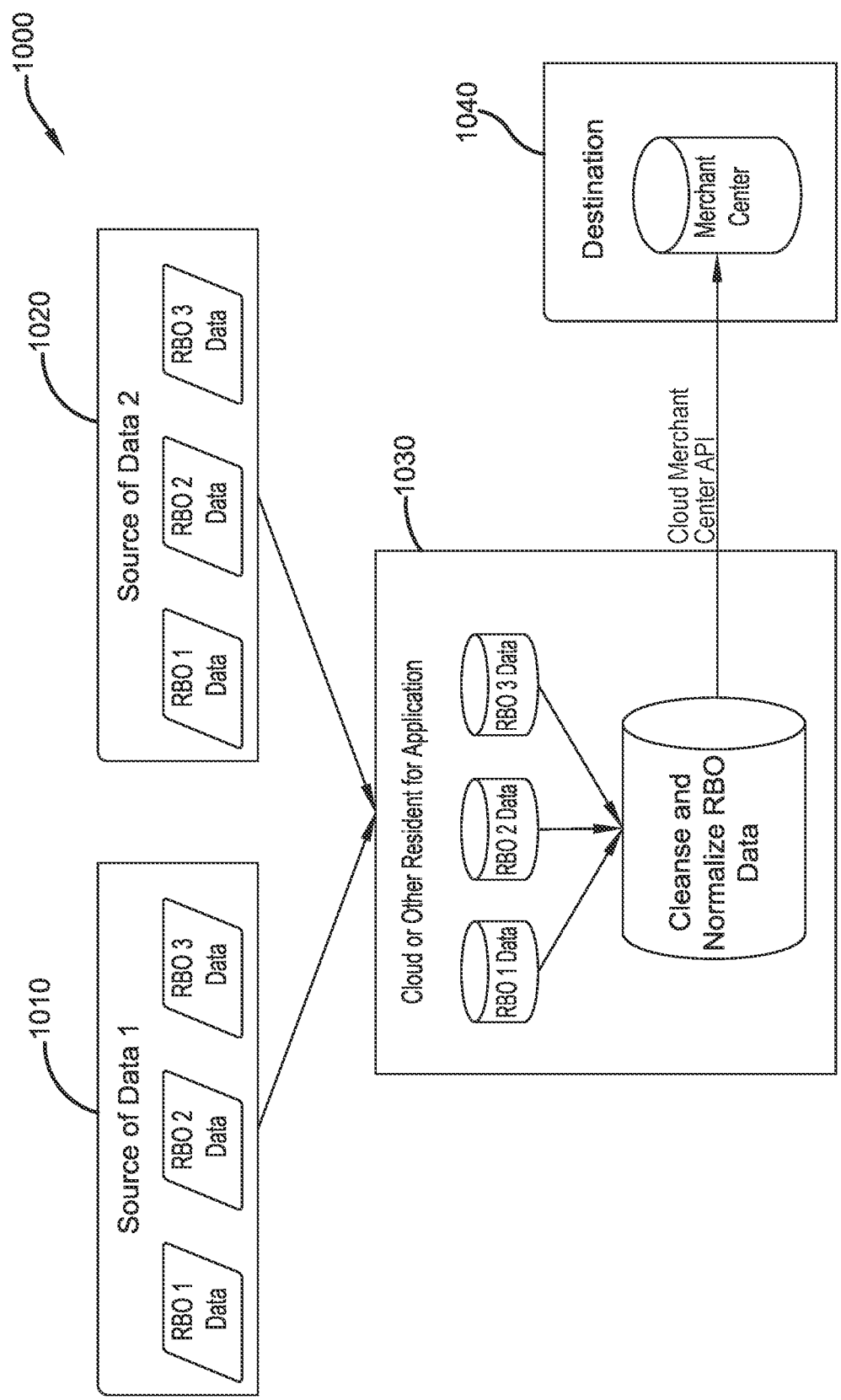
FIG. 10 is a schematic block diagram of a data collection system for a plurality of collection points in accordance with the disclosed architecture.

As illustrated in FIG. 10, the data collection systems provide for multiple data sources to collect and send data to a cloud application for merging and sending to an ultimate destination center. Here, a system 1000 contains a plurality of data sources 1010 and 1020 that send the collected data to a designated cloud application 1030. The designated cloud application 1030 collects the data, merges it with additional data, and sends the collected and additional data to the destination 1040 similar to the previous embodiments as described supra.

Figure 11:
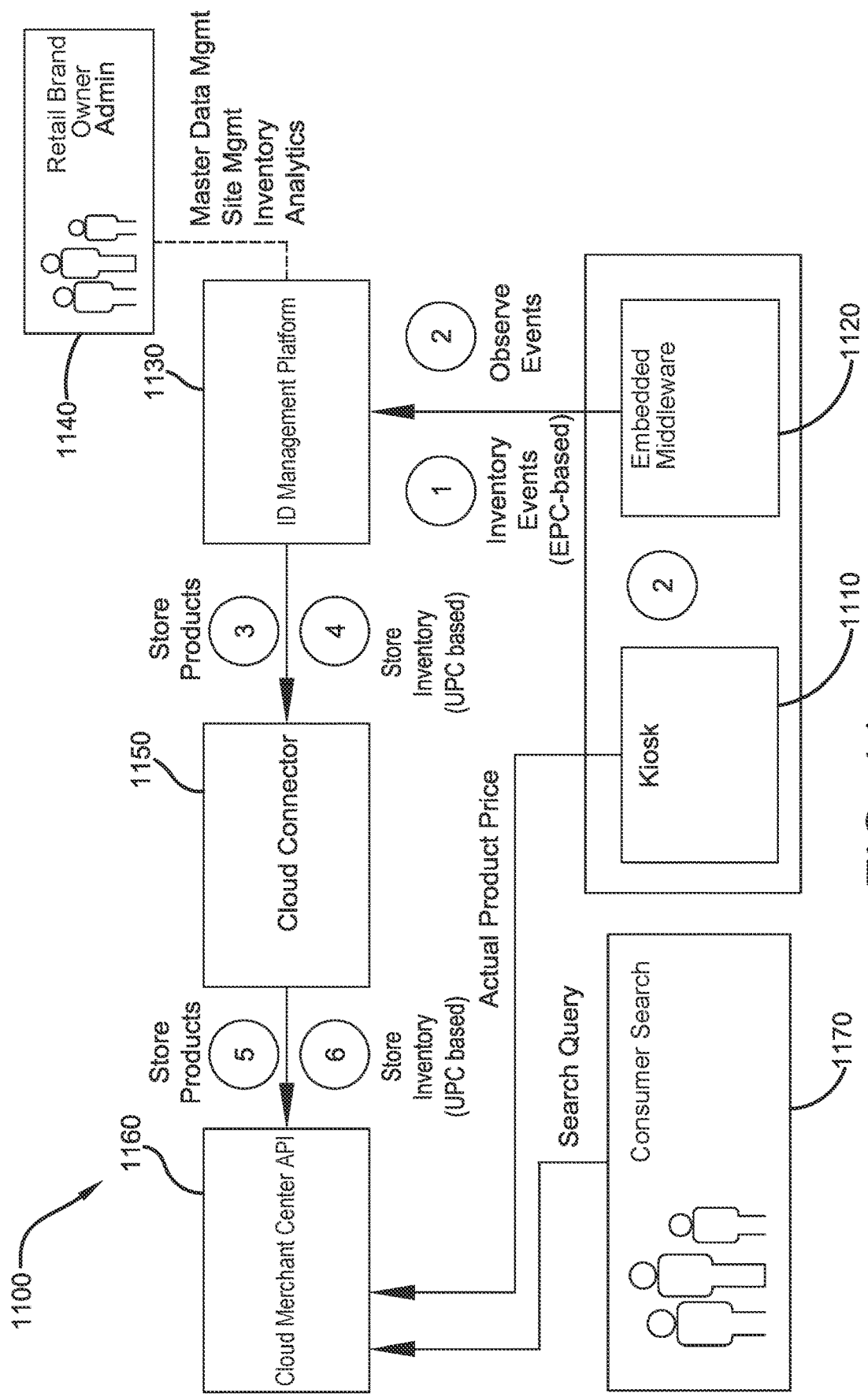
FIG. 11 is an exemplary flow diagram of a method for data collection, packaging, and delivery in accordance with the disclosed architecture.

FIG. 11 illustrates a method 1100 for data collection. The method 1100 begins at step 1110 as a RFID encoded product is placed on a smart shelf. A RFID wireless data analysis is then performed by a RFID reader at step 1120 to collect data about the product. The collected data is sent to a repository at step 1130, and, at step 1140, the repository sends the data to a master-data management site for inventory analytics. At step 1150, the repository sends the data to a cloud connector, and the cloud connector sends the data to a destination cloud application at step 1160, which is searchable by a consumer at step 1170. The smart shelf may also send pricing or other useful information about the product directly to the destination cloud application. Tables 2-4 include examples of data that may be collected and sent in the previous embodiments.

TABLE 2

Data Example

| | |
|---|---|
| GTIN | \| 99999999999999 = 0101101011110011000100000111101000111111111111111 |
| Date Code | \| 20201231 = 0001001101000011111100001111 |
| Lot | \| 999999 = 11110100001000111111 |
| Serial Number | \| 4294967295 = 11111111111111111111111111111111 |
| GTIN | = 14 Digits = 48 Bits |
| Date Code | = 8 Digits = 28 Bits |
| Lot | = 6 Digits = 20 Bits |
| Serial Number | = 10 Digits = 32 Bits |
| | -------- |
| | 128 Bits |

==================================================================
01011010111100110001000011110100011111111111110001001101000011111100001111111010
000100011111111111111111111111111111111111111111
GTIN Date Lot Serial#
EPC = 5AF3107A3FFF1343F0FF423FFFFFFFFF
==================================================================

| | | | |
|---|---|---|---|
| Gtin | Date | Lot | SN |
| 868137000177.00 | 20200515 | 123456 | 4294967295 |
| EPC Example | | | |
| CA20FF5CF11343C431E240FFFFFFFF | | | |

TABLE 3

Data Example

| Parameter name | Value | Description |
|---|---|---|
| Path parameters | | |
| merchantId | unsigned long | The ID of the POS or inventory data provider. |
| targetMerchantId | unsigned long | The ID of the target merchant |
| Property name | Value | Description |
| storeCode | String | The identifier of the merchant's store. Either a store Code inserted via the API or the code of the store in Google My Business. |
| itemId | String | A unique identifier for the item. |
| targetCountry | String | The CLDR territory code for the item. |
| contentLanguage | String | The two-letter ISO 639-1 language code for the item. |
| gtin | String | Global Trade Item Number. |
| price | nested object | The current price of the item. |
| price.value | String | The price represented as a number. |
| price.currency | String | The currency of the price. |
| quantity | Long | The available quantity of the item. |
| timestamp | String | The inventory timestamp, in ISO 8601format. |

TABLE 4

Data Example

| Parameter name | Value | Description |
|---|---|---|
| Path parameters | | |
| merchantId | unsigned long | The ID of the account that contains the product. This account cannot be a multi-client account. |
| feedId | unsigned long | |

TABLE 4-continued

| Property name | Value | Description |
|---|---|---|
| | | Data Example |
| channel | String | The item's channel (online or local). Acceptable values are: "local" "online" |
| contentLanguage | String | The two-letter ISO 639-1 language code for the item. |
| offerId | String | A unique identifier for the item. Leading and trailing whitespaces are stripped and multiple whitespaces are replaced by a single whitespace upon submission. Only valid unicode characters are accepted. See the products feed specification for details. Note: Content API methods that operate on products take the REST ID of the product, not this identifier. |
| targetCountry | String | The CLDR territory code for the item. |
| additionalImageLinks[ ] | List | Additional URLs of images of the item. |
| adsGrouping | String | Used to group items in an arbitrary way. Only for CPA %, discouraged otherwise. |
| adsLabels[ ] | List | Similar to ads_grouping, but only works on CPC. |
| adsRedirect | String | Allows advertisers to override the item URL when the product is shown within the context of Product Ads. |
| adult | Boolean | Set to true if the item is targeted towards adults. |
| ageGroup | String | Target age group of the item. |
| availability | String | Availability status of the item. |
| availabilityDate | String | The day a pre-ordered product becomes available for delivery, in ISO 8601 format. |
| brand | String | Brand of the item. |
| color | String | Color of the item. |
| condition | string | Condition or state of the item. |
| costOfGoodsSold | nested object | Cost of goods sold. Used for gross profit reporting. |
| costOfGoodsSold.currency | string | The currency of the price. |
| costOfGoodsSold.value | string | The price represented as a number. |
| customAttributes[ ] | list | A list of custom (merchant-provided) attributes. It can also be used for submitting any attribute of the feed specification in its generic form (e.g., {"name": "size type", "value": "regular" }). This is useful for submitting attributes not explicitly exposed by the API. |
| customAttributes[ ].groupValues[ ] | list | Subattributes within this attribute group. Exactly one of value or group Values must be provided. |
| customAttributes[ ].name | string | The name of the attribute. Underscores will be replaced by spaces upon insertion. |
| customAttributes[ ].value | string | The value of the attribute. |
| customLabel0 | string | Custom label 0 for custom grouping of items in a Shopping campaign. |
| customLabel1 | string | Custom label 1 for custom grouping of items in a Shopping campaign. |
| customLabel2 | string | Custom label 2 for custom grouping of items in a Shopping campaign. |
| customLabel3 | string | Custom label 3 for custom grouping of items in a Shopping campaign. |
| custom Label4 | string | Custom label 4 for custom grouping of items in a Shopping campaign. |
| description | string | Description of the item. |
| displayAdsId | string | An identifier for an item for dynamic remarketing campaigns. |
| displayAdsLink | string | URL directly to your item's landing page for dynamic remarketing campaigns. |
| displayAdsSimilarIds[ ] | list | Advertiser-specified recommendations. |
| displayAdsTitle | string | Title of an item for dynamic remarketing campaigns. |
| displayAdsValue | double | Offer margin for dynamic remarketing campaigns. |
| energyEfficiencyClass | string | The energy efficiency class as defined in EU directive 2010/30/EU. |
| excluded Destinations[ ] | list | The list of destinations to exclude for this target (corresponds to unchecked check boxes in Merchant Center). |
| expirationDate | string | Date on which the item should expire, as specified upon insertion, in ISO 8601 format. The actual expiration date in Google Shopping is exposed in product statuses as google Expiration Date and might be earlier if expiration Date is too far in the future. |
| gender | string | Target gender of the item. |
| googleProductCategory | string | Google's category of the item (see Google product taxonomy). |
| gtin | string | Global Trade Item Number (GTIN) of the item. |
| identifierExists | boolean | False when the item does not have unique product identifiers appropriate to its category, such as GTIN, MPN, and brand. Required according to the Unique Product Identifier Rules for all target countries except for Canada. |

TABLE 4-continued

| | | Data Example |
|---|---|---|
| imageLink | string | URL of an image of the item. |
| includedDestinations[ ] | list | The list of destinations to include for this target (corresponds to checked check boxes in Merchant Center). Default destinations are always included unless provided in excluded Destinations. |
| installment | nested object | Number and amount of installments to pay for an item. Brazil only. |
| installment.amount | nested object | The amount the buyer has to pay per month. |
| installment.amount.currency | string | The currency of the price. |
| installment.amount.value | string | The price represented as a number. |
| installment.months | long | The number of installments the buyer has to pay. |
| isBundle | boolean | Whether the item is a merchant-defined bundle. A bundle is a custom grouping of different products sold by a merchant for a single price. |
| itemGroupId | string | Shared identifier for all variants of the same product. |
| link | string | URL directly linking to your item's page on your website. |
| loyaltyPoints | nested object | Loyalty points that users receive after purchasing the item. Japan only. |
| loyaltyPoints.name | string | Name of loyalty points program. It is recommended to limit the name to 12 full-width characters or 24 Roman characters. |
| loyaltyPoints.pointsValue | long | The retailer's loyalty points in absolute value. |
| loyaltyPoints.ratio | double | The ratio of a point when converted to currency. Google assumes currency based on Merchant Center settings. If ratio is left out, it defaults to 1.0. |
| material | string | The material of which the item is made. |
| maxEnergyEfficiencyClass | string | The energy efficiency class as defined in EU directive 2010/30/EU. |
| maxHandlingTime | long | Maximal product handling time (in business days). |
| minEnergyEfficiencyClass | string | The energy efficiency class as defined in EU directive 2010/30/EU. |
| minHandlingTime | long | Minimal product handling time (in business days). |
| mobileLink | string | Link to a mobile-optimized version of the landing page. |
| mpn | string | Manufacturer Part Number (MPN) of the item. |
| multipack | long | The number of identical products in a merchant-defined multipack. |
| pattern | string | The item's pattern (e.g. polka dots). |
| price | nested object | Price of the item. |
| price.currency | string | The currency of the price. |
| price.value | string | The price represented as a number. |
| productTypes[ ] | list | Categories of the item (formatted as in products data specification). |
| promotionIds[ ] | list | The unique ID of a promotion. |
| salePrice | nested object | Advertised sale price of the item. |
| saleprice.currency | string | The currency of the price. |
| salePrice.value | string | The price represented as a number. |
| salePriceEffectiveDate | string | Date range during which the item is on sale (see products data specification). |
| sellOnGoogleQuantity | long | The quantity of the product that is available for selling on Google. Supported only for online products. |
| shipping[ ] | list | Shipping rules. |
| shipping[ ].country | string | The CLDR territory code of the country to which an item will ship. |
| shipping[ ].locationGroupName | string | The location where the shipping is applicable, represented by a location group name. |
| shipping[ ].locationId | long | The numeric ID of a location that the shipping rate applies to as defined in the AdWords API. |
| shipping[ ].postalCode | string | The postal code range that the shipping rate applies to, represented by a postal code, a postal code prefix followed by a * wildcard, a range between two postal codes or two postal code prefixes of equal length. |
| shipping[ ].price | nested object | Fixed shipping price, represented as a number. |
| shipping[ ].price.currency | string | The currency of the price. |
| shipping[ ].price.value | string | The price represented as a number. |
| shipping[ ].region | string | The geographic region to which a shipping rate applies. |
| shipping[ ].service | string | A free-form description of the service class or delivery speed. |
| shippingHeight | nested object | Height of the item for shipping. |
| shippingHeight.unit | string | The unit of value. |
| shippingHeight.value | double | The dimension of the product used to calculate the shipping cost of the item. |
| shippingLabel | string | The shipping label of the product, used to group product in account-level shipping rules. |
| shippingLength | nested object | Length of the item for shipping. |
| shippingLength.unit | string | The unit of value. |
| shippingLength.value | double | The dimension of the product used to calculate the shipping cost of the item. |

TABLE 4-continued

| | Data Example | |
|---|---|---|
| shippingWeight | nested object | Weight of the item for shipping. |
| shippingWeight.unit | string | The unit of value. |
| shippingWeight.value | double | The weight of the product used to calculate the shipping cost of the item. |
| shippingWidth | nested object | Width of the item for shipping. |
| shippingWidth.unit | string | The unit of value. |
| shippingWidth.value | double | The dimension of the product used to calculate the shipping cost of the item. |
| sizeSystem | string | System in which the size is specified. Recommended for apparel items. |
| sizeType | string | The cut of the item. Recommended for apparel items. |
| sizes[ ] | list | Size of the item. |
| taxCategory | string | The tax category of the product, used to configure detailed tax nexus in account-level tax settings. |
| taxes[ ] | list | Tax information. |
| taxes[ ].country | string | The country within which the item is taxed, specified as a CLDR territory code. |
| taxes[ ].locationId | long | The numeric ID of a location that the tax rate applies to as defined in the AdWords API. |
| taxes[ ].postalCode | string | The postal code range that the tax rate applies to, represented by a ZIP code, a ZIP code prefix using * wildcard, a range between two ZIP codes or two ZIP code prefixes of equal length. Examples: 94114, 94*, 94002-95460, 94*-95* |
| taxes[ ].rate | double | The percentage of tax rate that applies to the item price. |
| taxes[ ].region | string | The geographic region to which the tax rate applies. |
| taxes[ ].taxShip | boolean | Set to true if tax is charged on shipping. |
| title | string | Title of the item. |
| transitTimeLabel | string | The transit time label of the product, used to group product in account-level transit time tables. |
| unitPricingBaseMeasure | nested object | The preference of the denominator of the unit price. |
| unitPricingBaseMeasure.unit | string | The unit of the denominator. |
| unitPricingBaseMeasure.value | long | The denominator of the unit price. |
| unitPricingMeasure | nested object | The measure and dimension of an item. |
| unitPricingMeasure.unit | string | The unit of the measure. |
| unitPricingMeasure.value | double | The measure of an item. |

Figure 12:
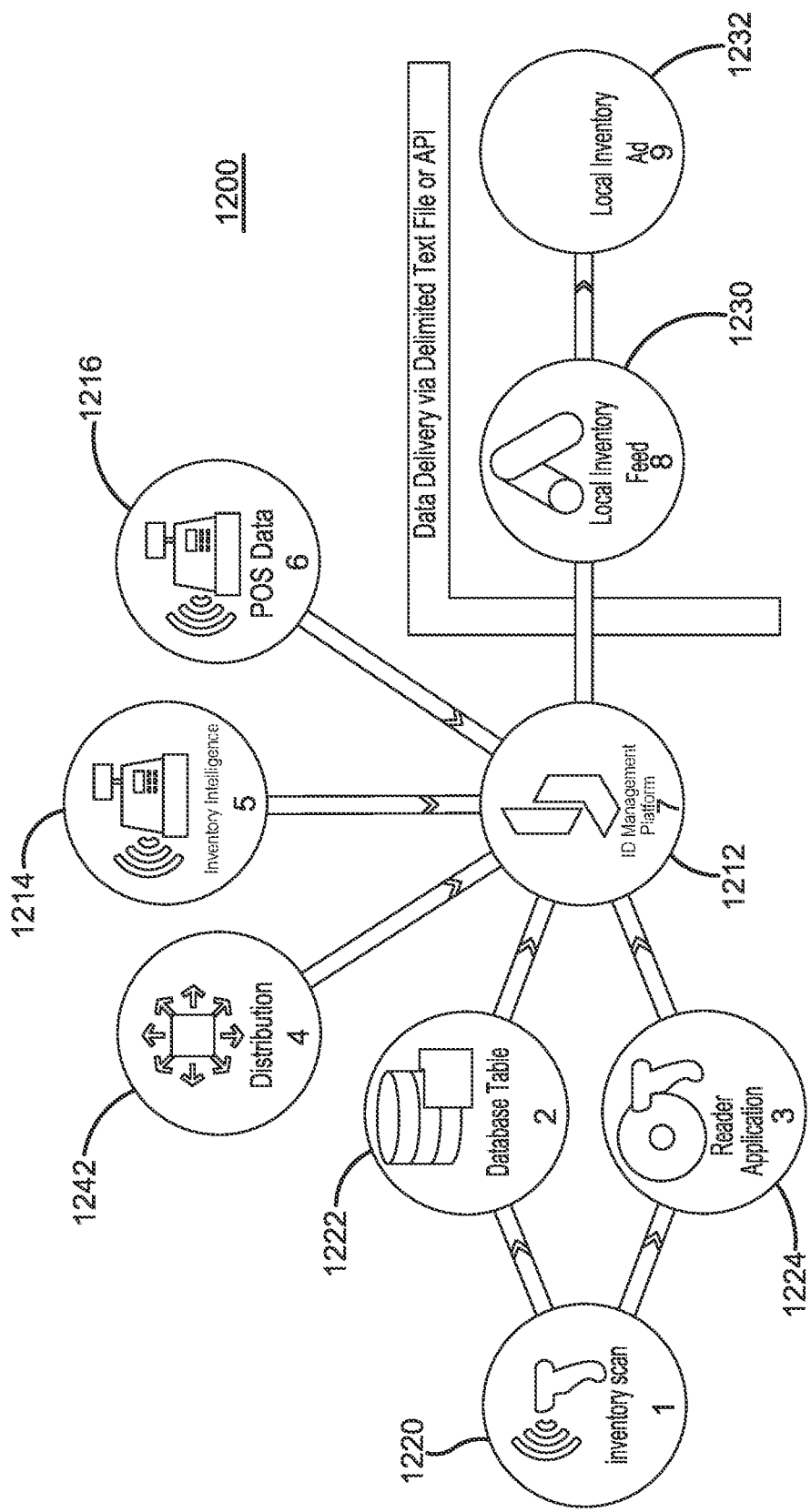
FIG. 12 is an exemplary flow diagram of a system for collecting, packaging, and delivering data accepted from a plurality of collection points in accordance with the disclosed architecture.

FIG. 12 illustrates a system 1200 for collecting, packaging, and delivering data from a plurality of collection points. The plurality of collection points may contain data from a distribution source 1212, an inventory intelligence 1214, and a point of sale 1216. The system 1200 contains a connector hub 1212 for collecting the data from the plurality of collection points. The plurality of collection points may further contain data from an inventory scan 1220 for a serialized item 110, as described in the previous embodiments. The inventory scan 1220 sends collected data to a reader application 1224 and a database table 1222. The reader application 1224 and the database table 1222 both then send the data on to the distribution source 1212.

Figure 13:
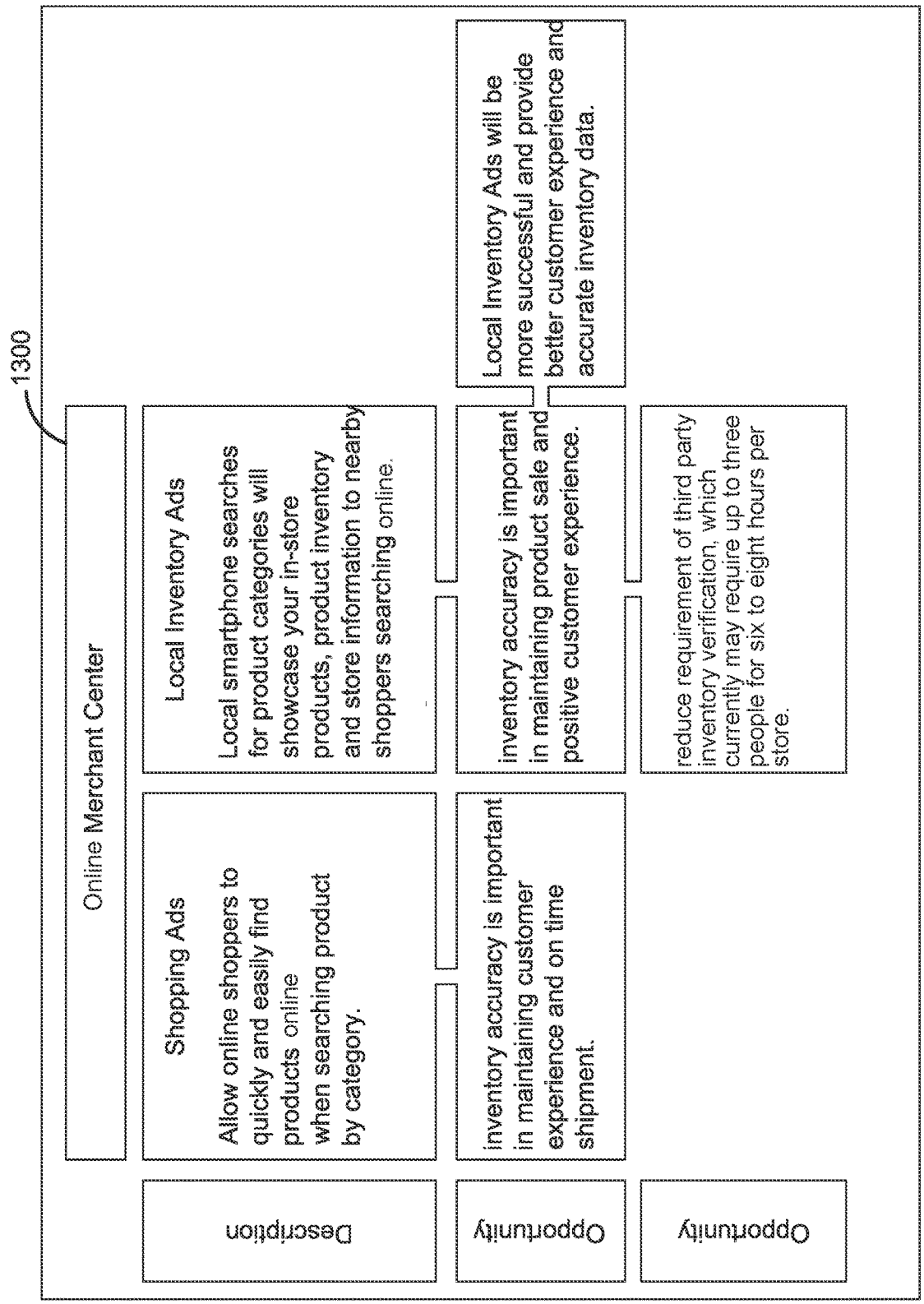
FIG. 13 is a block diagram of a destination cloud application of a system for collecting, packaging, and delivering data in accordance with the disclosed architecture.

The distribution source 1212 collects the data and sends it to a local inventory feed 1230 that can create a local inventory advertisement 1232. As illustrated in FIG. 13, the local inventory advertisement 1232 is created in a merchant center 1300 of a destination cloud application as described in previous embodiments as discussed supra. Additionally, the plurality of collection points may include any type of data collection that is applicable for the desired application.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for collecting, packaging, and delivering data, the system comprising:
   a repository for receiving data about a serialized item from a source; and
   a destination application for receiving and publishing the data from the repository.

2. The system of claim 1, wherein the destination application is a cloud application.

3. The system of claim 1, wherein the serialized item is a consumer product serialized with a data carrying technology.

4. The system of claim 3, wherein the serialized item is an RFID tagged item.

5. The system of claim 3, wherein the serialized item is a UPC tagged item.

6. The system of claim 3, wherein the serialized item is a ERP tagged item.

7. The system of claim 3, wherein the serialized item has a digital identity.

8. The system of claim 7, wherein the digital identity comprises an item unique identity or an item expiration.

9. The system of claim 1, wherein the source is an edge device.

10. The system of claim 1, wherein the repository is configured to manage a digital identity of the serialized item.

11. The system of claim 1, wherein the repository is configured to combine the received data about the serialized item from the source with additional item specific data.

12. The system of claim 1, wherein the destination application is configured to display searchable data about the serialized item in a local area.

13. The system of claim 1, wherein the destination application is configured to send data about the serialized item to the source.

14. The system of claim 1, wherein the destination application is configured to adjust a price of the serialized item.

15. The system of claim 1, wherein the destination application comprises a cloud merchant center.

16. A system for collecting, packaging, and delivering data, the system comprising a destination application for receiving, manipulating, and publishing data about a serialized item from a source via a connector.

17. The system of claim 16, wherein the destination application is a cloud application.

18. The system of claim 16, wherein destination application is configured to combine the received data about the serialized item with additional item specific data.

19. The system of claim 16, wherein the destination application is configured to display searchable data related to the serialized item in a local area.

20. The system of claim 16, wherein the destination application is configured to send data about the serialized item to the source.

21. A system for increasing migration and accessibility of data, the system comprising:
    a designated application for merging received data about a serialized item from a source with additional item specific data; and
    a destination application for receiving, manipulating, and publishing merged data from the designated application.

22. The system of claim 21, wherein the designated application, destination application, or both are cloud applications.

23. The system of claim 21, wherein the designated application is configured to receive data from a plurality of collection points.

24. The system of claim 21, wherein the destination application is configured to provide an inventory update for the serialized item based on the merged data.

25. The system of claim 21, wherein the destination application is configured to manipulate pricing information for the serialized item based on the merged data.

26. The system of claim 21, wherein the destination application receives the merged data from the designated cloud application via an active directory cloud connector.

27. The system of claim 23, wherein the plurality of collection points comprises data from an inventory scan for the serialized item.

28. The system of claim 27, wherein the plurality of collection points further comprises data from a distribution source, a point of sale or a data center.

29. The system of claim 23, wherein the system comprises a connector hub for collecting data for collecting data from the plurality of collection points.

* * * * *